F. GROSS.
BRUSH CUTTER.
APPLICATION FILED FEB. 20, 1919.
1,356,619.
Patented Oct. 26, 1920.
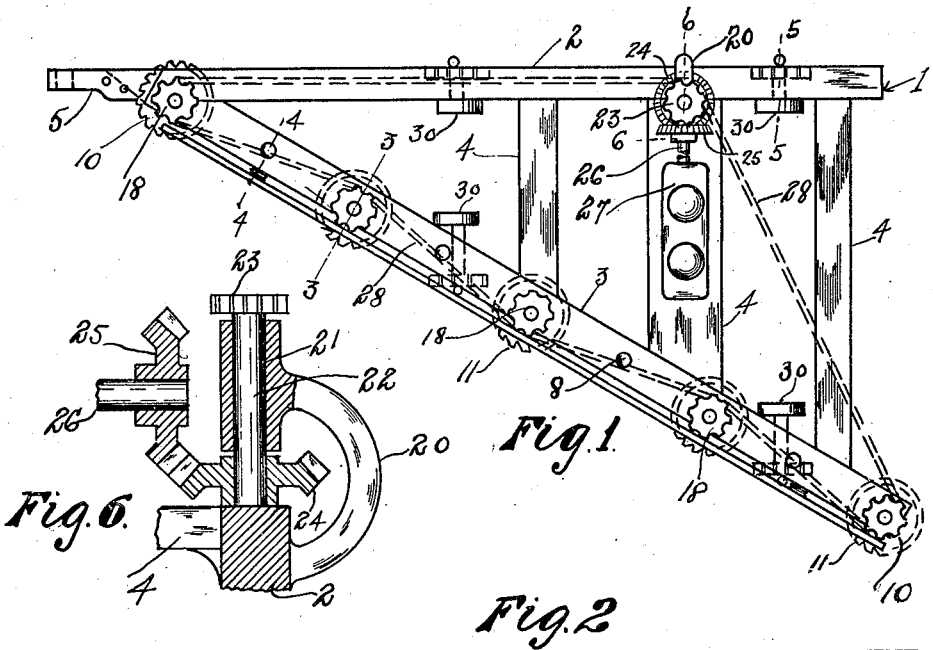
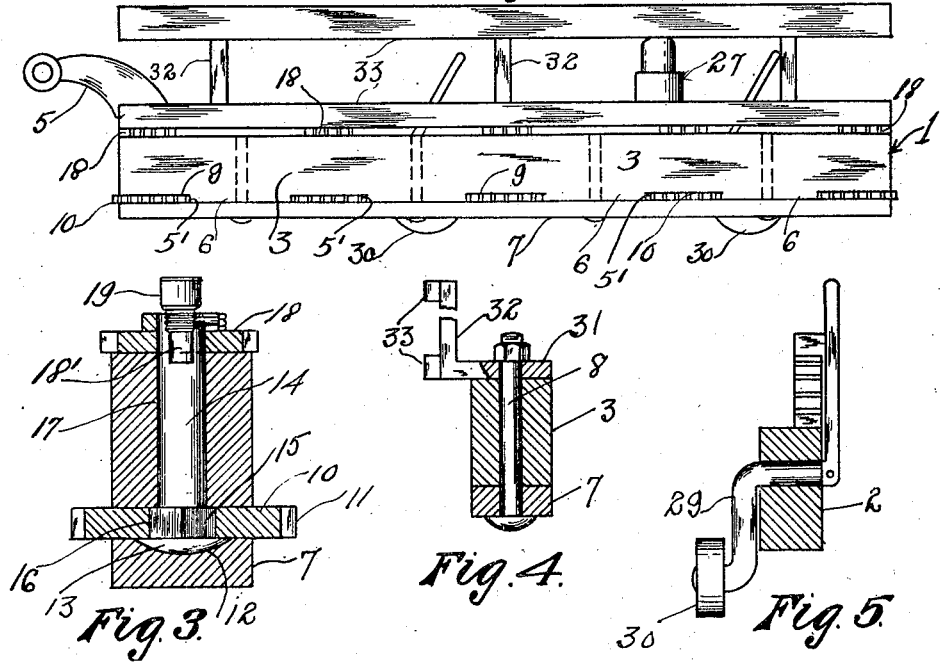
INVENTOR
Frank Gross
BY
ATTORNEY

UNITED STATES PATENT OFFICE.

FRANK GROSS, OF DENVER, COLORADO.

BRUSH-CUTTER.

1,356,619. Specification of Letters Patent. Patented Oct. 26, 1920.

Application filed February 20, 1919. Serial No. 278,226.

*To all whom it may concern:*

Be it known that I, FRANK GROSS, a citizen of the United States, residing at Denver, in the county of Denver and State of Colorado, have invented new and useful Improvements in Brush-Cutters, of which the following is a specification.

The present invention is directed to improvements in brush cutters, and has for its object to provide a device of this character constructed in such a manner that it may be drawn across a field, and during which it will cut the brush, weeds, or other objectionable growths.

A further object of the invention is to provide a device of this nature provided with a plurality of alined cutters which are rotated in opposite directions through the medium of an endless motor propelled sprocket chain.

Another object of the invention is to provide a machine comprising a frame capable of vertical adjustment, whereby the cutters may be raised or lowered to cut brush and the like at different distances from the ground line.

A still further object of the invention is to provide novel bearings for the cutter shafts; and further novel means for lubricating the shafts and bearings.

With these and other objects in view, this invention resides in the novel features of construction, formation, combination and arrangement of parts to be hereinafter more fully described, claimed and illustrated in the accompanying drawing, in which:—

Figure 1 is a top plan view of the device.

Fig. 2 is a side elevation of the same.

Fig. 3 is a sectional view on line 3—3 of Fig. 1.

Fig. 4 is a sectional view on line 4—4 of Fig. 1.

Fig. 5 is a sectional view on line 5—5 of Fig. 1.

Fig. 6 is a sectional view on line 6—6 of Fig. 1.

Referring to the drawing, 1 designates a frame consisting of beams 2 and 3 suitably connected at their forward ends, and braced transversely by platforms 4. To the forward end of the frame is connected a bracket 5 to which a tractor or draft animals may be attached to draw the machine across a field. The beams 2 and 3 are preferably arranged as shown, but it will be of course understood that they may be arranged differently if desired. These beams are preferably formed of cast metal, but may be formed from other material if desired. It will be noted that the beam 3 has formed in its lower edge recesses 5′. The portions between the recesses 5′ are designated by the numeral 6. A strip 7 is employed, and closes the open ends of the recesses 5′, said strip bearing against the lower ends of the portions 6, and are held in tight engagement thereon by bolts 8, as shofn in Fig. 4 of the drawing. Thus it will be seen that when the portions 6 are engaged with the strip 7 recesses 9 are produced, and in which are rotatably mounted cutters 10, said cutters being formed with teeth 11.

The strip is provided with spaced concave bearings 12 in which are rotatably mounted the conical heads 13 of the shafts 14, said shafts being formed with squared portions 15, which are engaged with the squared openings 16 formed in the cutters 10 so that when rotary movement is imparted to the shafts similar movement will be imparted to the cutters.

The shafts 14 rotate in bearing 17 formed in the beam 3, and have their upper ends extended above the plane of the beam, and to these extended ends are secured sprocket wheels 18.

As shown in Fig. 3 the shafts 14 have longitudinal slots 18′ formed therein, and threaded in these slots are the nipples of oil cups 19. It is obvious that oil from the cups will keep the bearing properly lubricated.

Carried by the beam 2 is a bracket 20 having a bearing 21 for supporting the shaft 22, the upper end of which has mounted thereon a sprocket wheel 23. Keyed to the lower end of the shaft 22 is a bevel gear 24 which meshes with a similar gear 25 carried by the shaft 26 of the motor 27, said motor being mounted on the intermediate platform 4.

An endless sprocket chain 28 is employed and is trained around the sprockets 18 and the sprocket 23. It will be observed that the chain 28 engages the sprockets 18 on alternate sides, or in zig-zag relation, as clearly shown in Fig. 1. When the motor 27 is in motion the sprocket 23 will be rotated through the medium of the gears 24 and 25, thus causing the chain 28 to travel and thereby rotating the cutters 10 in opposite directions. From the foregoing it will be noted that as the cutters rotate that the teeth 11 thereof will force the brush against the beam 3 so as to shear the same.

Crank axles 29 are carried by the beams 2 and 3, and are provided with wheels 30, said axles being adjustable in a well known manner to permit the frame 1 to be adjusted vertically to regulate the cutting action of the cutters 10.

Certain of the bolts 8 have their upper ends engaged with brackets 31, the vertical arms 32 having vertically spaced horizontal slats 33 secured thereto which serve as fenders. These fenders prevent the brush from falling on the chain, sprockets and frame.

It is thought that the operation and advantages of the present invention will be apparent to those skilled in the art without further description, when taken in connection with the accompanying drawing.

In the drawing five of the cutters 10 are illustrated, but it will be of course understood that the number may be increased or diminished as the occasion may require. It will be obvious, however, that an uneven number of cutters are required, since it is desired that the same rotate in opposite direction.

It will be understood that various changes in size, shape, proportion and minor details of construction, may be resorted to without departing from the spirit or sacrificing any of the advantages of the invention.

What is claimed is:

1. A brush cutter comprising a frame consisting of a pair of beams, one having recesses formed therein, a strip fixed to the beam for closing the open ends of the recesses, vertical shafts rotatably mounted in said beam, and having their lower ends extended into the recesses and journaled in the strip, cutters located in the recesses and fixed to the lower ends of the shafts, sprockets fixed to the upper ends of the shafts, an endless chain engaged with the alternate sides of the sprockets, means carried by the frame for imparting movement to the chain to rotate the shafts, and thus the cutters, and crank axles carried by both beams, and operable to raise and lower the beams independently.

2. A brush cutter comprising a triangular frame consisting of a pair of horizontal beams, one of the beams having recesses formed on its lower edge, a continuous strip, fender bearing brackets having their lower ends resting on the upper edge of said beam, bolts passable through the portion of the beam between the recesses and serving to hold the strip in binding engagement therewith and the lower ends of the brackets in binding engagement with the upper edge of said beam, shafts rotatably mounted in said beam, and having their lower ends extended into the recesses and provided with heads, said heads bearing in the strip, cutters fixed to the lower ends of the shafts and located in the recesses, sprockets fixed to the upper ends of the shafts, and endless chain engaged with the alternate sides of the sprockets, and means on the frame for imparting movement to the chain as and for the purpose set forth.

In testimony whereof I have hereunto set my hand in presence of two subscribing witnesses.

FRANK GROSS.

Witnesses:
   A. T. BOWES,
   WATSON E. BOWES.